(12) United States Patent
Copello et al.

(10) Patent No.: US 8,761,917 B2
(45) Date of Patent: Jun. 24, 2014

(54) MES WITH EMBEDDED REPEATABLE SEGMENT REQUIREMENTS

(75) Inventors: Paolo Copello, Rapallo (IT); Alessandro Raviola, Genoa (IT)

(73) Assignee: Siemens Aktiengesellschaft, Munich (DE)

( * ) Notice: Subject to any disclaimer, the term of this patent is extended or adjusted under 35 U.S.C. 154(b) by 307 days.

(21) Appl. No.: 13/275,900

(22) Filed: Oct. 18, 2011

(65) Prior Publication Data

US 2012/0123580 A1    May 17, 2012

(30) Foreign Application Priority Data

Nov. 11, 2010  (EP) ..................................... 10190806

(51) Int. Cl.
*G05B 19/418* (2006.01)
(52) U.S. Cl.
USPC .... 700/104; 700/99; 707/999.001; 707/999.1
(58) Field of Classification Search
USPC ........ 700/95, 99, 103, 104; 707/999.1, 999.2, 707/999.001, E17.001, E17.002, E17.005
See application file for complete search history.

(56) References Cited

U.S. PATENT DOCUMENTS

| 5,450,333 | A | 9/1995 | Minami et al. | |
| 7,315,851 | B2 * | 1/2008 | Cheng et al. | 1/1 |
| 7,346,480 | B1 * | 3/2008 | Pekarek et al. | 703/14 |
| 7,356,377 | B2 * | 4/2008 | Schwarm | 700/108 |
| 8,042,024 | B2 * | 10/2011 | Parimi | 714/776 |
| 2005/0021534 | A1 * | 1/2005 | Cheng et al. | 707/100 |
| 2005/0171626 | A1 * | 8/2005 | Schwarm | 700/108 |
| 2007/0192152 | A1 | 8/2007 | Frank | |
| 2008/0168102 | A1 * | 7/2008 | Parimi | 707/200 |
| 2008/0188956 | A1 | 8/2008 | Hood et al. | |

* cited by examiner

*Primary Examiner* — Charles Kasenge
(74) *Attorney, Agent, or Firm* — Laurence A. Greenberg; Werner H. Stemer; Ralph E. Locher

(57) ABSTRACT

A manufacturing executing system (MES) contains computing devices and software tools to control machines involved in a production process. The MES is configured to realize production requirements having at least one segment requirement. The MES further contains measures for a user to define whether a segment requirement is repeatable, and a database configured to store segment requirements. The database contains for each segment requirement: a dedicated area to store each segment requirement repeatability status; a dedicated area to store at least a current value of a parameter acquired during an execution of the segment requirement and representing the result of the execution of the segment requirement; and a dedicated area to store expected values of the parameter. Finally, the MES contains a coordinator operable to communicate with the database to access the segment requirement, and operable to determine whether the execution of a segment requirement has to be repeated.

3 Claims, 2 Drawing Sheets

MES WITH EMBEDDED REPEATABLE SEGMENT REQUIREMENTS

CROSS-REFERENCE TO RELATED APPLICATION

This application claims the priority, under 35 U.S.C. §119, of European application EP 10190806, filed Nov. 11, 2010; the prior application is herewith incorporated by reference in its entirety.

BACKGROUND OF THE INVENTION

Field of the Invention

The present invention relates generally to the automation of production activities, and more specifically to a manufacturing execution system (MES) with embedded repeatable segment requirements.

The automation of product manufacture requires tools for managing the relevant information involved in the manufacture of a product, at the planning and the production levels. In particular, an accurate modelling of a production process is important for both scheduling and execution and, eventually, for achieving a good level of operational performance in manufacturing activities. One of these tools, called ISA-95 for International Standard Association-S95, is an international standard for developing an automated interface between an enterprise and a control system of a production process for global manufacturers. The ISA-95 standard is capable of defining how software tools may implement the production process at plant floor level and how to communicate with it, while using a standard terminology between different manufacturers for treating the relevant information.

Generally, the ISA-95 standard might be embedded in, or serve as common basis for the development of a manufacturing executing system (MES), i.e. an intermediate layer capable of providing computing machines and software tools between an enterprise resource planning (ERP) upper layer that is in particular dedicated to the planning of production processes, and a process line lower layer that is in particular dedicated to the control of single machines involved in the analysis of the production process or involved in the production process itself.

In other words, the MES is a dynamic information system that drives effective execution of manufacturing operations, by managing production operations from point of order release into manufacturing to point of product delivery into finished goods and by providing critical information about production activities to others across the organization and supply chain via bi-directional communication. The MES contains generally software tools for analysis management and software tools for productive process.

Usually, an ISA-95 standard contains a complex and hierarchical set of entities capable of representing a production process according to a structural description of the production process. The entities represent in particular the resources to be used during the execution of a production request. The ISA-95 standard is thus capable of modelling a production process, i.e. providing a conceptualization of the production process by representing entities involved in the production process, as well as interactions between these entities.

For example, a production process represented by a hierarchical structure within the ISA-95 standard might contain a Production Schedule entity containing at least one Production Request entity that might be defined according to a Product Production Rule entity. The Production Request entity may contain at least one Segment Requirement entity associated to a Process or Product Segment entity, and a Requested Segment Response entity configured for allowing a communication between MES systems. The Segment Requirement entity may contain different entities, like Production Parameter, Personnel Requirement, Equipment Requirement, Material Produced Requirement, Material Consumed Requirement, and Consumable Expected entities. The Production Parameter entity is generally associated to either a Product Parameter entity or a Process Segment Parameter entity. The Production Parameter is thus one of the entities belonging to the Segment Requirement entity. The Production Parameter entity represents production parameters used during or involved for the production. An example may be the velocity or the working temperature for equipment. Usually during production, the production parameters are used to drive the production, for example to set an equipment velocity/temperature. The Personnel Requirement entity represents the personnel resources needed by the segment requirement for its execution. It might contain a Personnel Requirement Property entity, which may itself contain a Personnel Model entity. The Personnel Requirement Property and the Personnel Model entity usually are configured for providing generic information related to the personnel resources. Similarly, the Equipment Requirement entity might be associated to at least one Equipment Requirement Property entity that may correspond to an element in an Equipment Model entity. Also, the Material Produced and Material Consumed Requirements entities may respectively be each associated to at least one Material Produced Requirement Property entity and one Material Consumed Requirement Property entity that may correspond to at least one element in a Material Model entity. In other words, each of the Personnel, Equipment, and Material Model entities, contains some characteristics of the personnel, the equipment and the material that help in choosing the right personnel, equipment or material for achieving a production request. The Segment Requirement entity may also contain a Consumable Expected entity configured for representing a potentially used material and which may be associated for example to at least one Consumable Expected Property entity that represents property information of the potentially used material.

The entities are thus connected with one another according to a structural representation of the production request and forming a system capable of exchanging and providing information. Connections between the entities and according to the structural (or hierarchical) representation are in particular designed for providing to the Production Schedule entity, information (like quantity of material, potentially used material, personnel required, velocity of a process, . . . ) allowing a correct evaluation or modelling of the production, so that the production activities might be precisely evaluated, prepared and scheduled (and executed too) for satisfying each production request and thus optimizing the production process.

Modelling of production system requires the division of the productive process in many steps or production phases, so that each phase represents a simple action which can be controlled by the MES system.

When the whole productive process starts its execution, the MES system manages the different production phases performing theirs execution and combining the result of each production phase to obtain a finished product. Usually the result of the production process is a final product (e.g.: Computers, Furniture, Lego Blocks, gas, oil) whereas the result of the production phases are intermediate product (diode, wooden planks, plastic).

Sometimes the result of a production phase composing the production process does not satisfy the quality requirements desired and cannot be used to achieve the final product. For example, the production of kitchen furniture requires pre-sized wooden planks, but it may happen that a sizing wooden plank obtained after the sizing step cannot be used because it does not satisfy a specific quality requirement.

In the same manner, it may happen that diodes produced in production phase do not work properly and therefore cannot be used in a computer production process.

In the aforementioned examples, the wooden planks sizing phase and the diodes production phase have to be repeated in order to achieve wooden planks and diodes satisfying the quality desired for the furniture and computers to be produced.

In the S95 the production process is called "production request" and the production phases are called "segment requirement", the production request being a collection of segment requirements.

Until now, during the modelling phase of a production process, there was no way to automatically take into account the occurrence of defaults or imperfections of an intermediate product produced during a segment requirement execution. This means that the user modelling the production process (production request) had to create a model not strictly related to the real production process.

Therefore the a way left for a user to correct such a default, for example a non conform wooden plank designed for making part of a furniture, was to add during the production process new segment requirements. Therefore the MES was modified during the production process by adding a new segment requirement representing the segment requirement which produced a result that did not satisfy the quality desired and that had to be repeated.

Furthermore, if during the modeling phase the user realizes that a segment requirement result may be unsatisfying, the user had to describe the workflow in the MES and foreseen which segment requirements may be executed more than once according to their result. To do that for each segment requirement repetition, the user had to create a new segment requirement and had to write himself the instructions the segment requirement to be repeated. This is complicated and time consuming. Furthermore, this solution is based only on the user's experience.

Besides, if some defaults can be predicted, others are unpredictable. Obviously the unpredictable default can be corrected only after their occurrence. Therefore the production process can only be modified during its execution.

SUMMARY OF THE INVENTION

It is accordingly an object of the invention to provide a MES with embedded repeatable segment requirements which overcome the above-mentioned disadvantages of the prior art methods and devices of this general type, which performs the modelling of a production process (production request) which takes into account the eventual defaults of an intermediate product which will be produced by an execution of a segment requirement composing the production process. In other words, it is an object of the present invention to provide a MES which allows a user to create a model closely related to the real production process and which can automatically adapt itself.

It is also another object of the present invention to provide a MES also allowing a user to add a segment requirement during the production process when an unpredictable default occurs during the production process.

The invention proposes measures to introduce the concept of repeatable segment requirement directly in the MES. In this way, the user modelling a productive process (production request) can create a model strictly related to the real production process. Furthermore, the user, strictly modelling the real production process with repeatable segment requirements, will no more need to use tricks in order to simulate repeatable segment requirement with simple segment requirement (in S95 meaning).

In this way, the production process (production request) will be composed of a set of repeatable segment requirements and/or a set of simple segment requirements. A user does not need anymore to modify his production process model during its execution as it contains repeatable segment requirement that can be executed an infinite number of times according to the factory quality requirements.

Using a MES according to the invention, a user is able to create a model close to the real situation that a MES system can find in a factory where human decisions and unpredictable events which do not respect the model foreseen in the production processes happen. A MES system according the invention is therefore able to automatically repeat the execution of a segment requirement according to criteria specified by the user. The new MES system reduces computation time and increases performances of production processes execution. In addition, the introduction of the repeatable segment requirement reduces the effort from the engineer point of view of simplifying his job during model creation and MES system programming.

In a first aspect the invention provides a manufacturing executing system (MES), contains a computing device and software tools to control machines involved in a production process. The MES is configured to realize production requirements having at least one segment requirement. The manufacturing executing system further contains means for a user to define whether a segment requirement is repeatable or not and a database configured to store segment requirements. The database contains for each segment requirement: a dedicated area to store each segment requirement repeatability status; a dedicated area to store at least a current value of a parameter acquired during an execution of the segment requirement and representing the result of the execution of the segment requirement; and a dedicated area to store expected values of the parameter. Finally, the MES has a coordinator operable to communicate with the database to access the segment requirement, and operable to determine whether or not the execution of a segment requirement has to be repeated.

In one embodiment, the coordinator is operable to restart automatically the execution of a segment requirement depending on the segment requirement repeatability status and on the result of the execution of segment requirement.

In one embodiment, the coordinator restarts the execution of the segment requirement when at least a current values of parameter acquired during an execution of segment requirement does not equal the stored expected value.

In a second aspect, the invention provides a method of producing a product using a MES according to one of the previous claims. The method includes in a modeling phase the steps of defining a production requirement containing a plurality of segment requirements; defining whether the segment requirement is repeatable or not for each segment requirement; if the segment requirement is repeatable, storing expected values to be reached by the execution of the segment requirement; and storing the segment requirement and its repeatability status in at least a database. In a production phase there are the steps of reading the repeatability status for each segment requirement; executing the segment requirement; if the segment requirement is repeatable, at the end of the segment requirement execution, checking whether or not the result of the segment requirement correspond to the expected values, and if not do the execution of the segment requirement step.

Other features which are considered as characteristic for the invention are set forth in the appended claims.

Although the invention is illustrated and described herein as embodied in a MES with embedded repeatable segment requirements, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE INVENTION

DETAILED DESCRIPTION OF THE INVENTION

Figure 1:
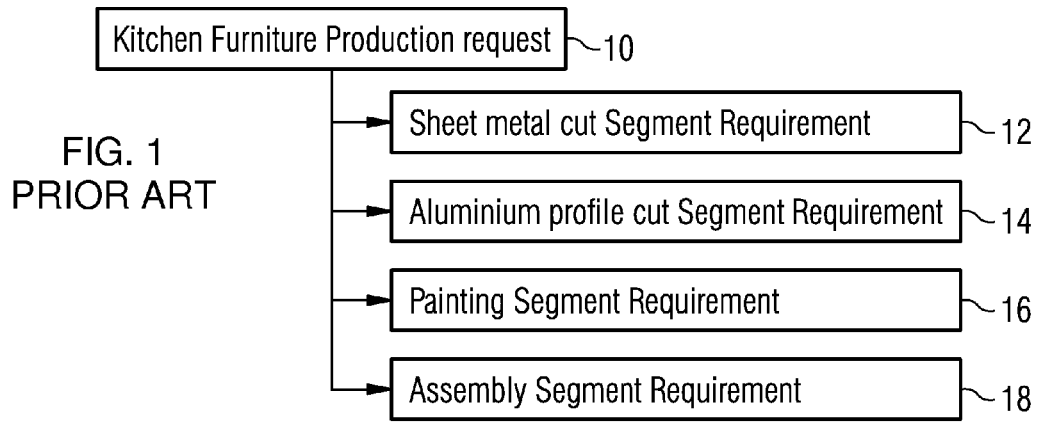
FIG. 1 is a schematic view of a production request for kitchen furniture according to the prior art.

Referring now to the figures of the drawing in detail and first, particularly, to FIG. 1 thereof, there is shown a schematic view of a production request 10 for kitchen furniture according to the prior art. The production request is composed of four different segment requirements which have to be executed by the MES to obtain the furniture. The first segment requirement 12 to be executed is the metal sheet cut segment requirement. The second segment requirement 14 to be executed by the MES is the aluminium profile cut segment requirement. Subsequently a painting 16 and an assembly 18 segment requirement are executed by the MES.

Figure 2:
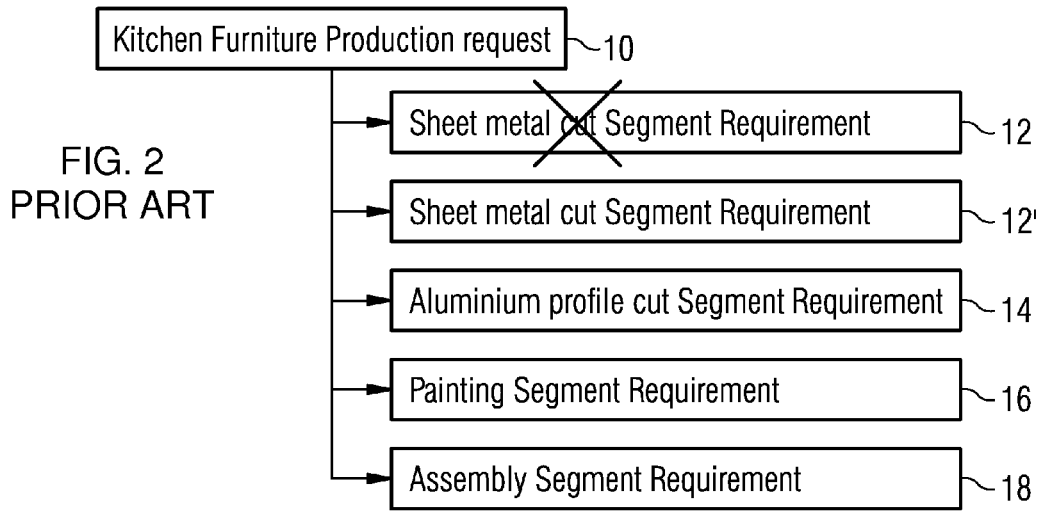
FIG. 2 is a schematic view of a production request for the kitchen furniture wherein a result of a segment requirement execution is not good enough and according to the prior art.

Supposing that during the kitchen furniture production request 10 execution, the metal cutting step 12 did not reach the required result, for example because the piece of metal has been cut too short on the production line, a new production request 12 representing a new metal cut has to be added by the user in the MES system managing the execution of the kitchen furniture. This is illustrated in FIG. 2 wherein a new step 12' has been added by the user. Of course this is time consuming as a user needs to control the result of each segment requirement himself.

Figure 3:
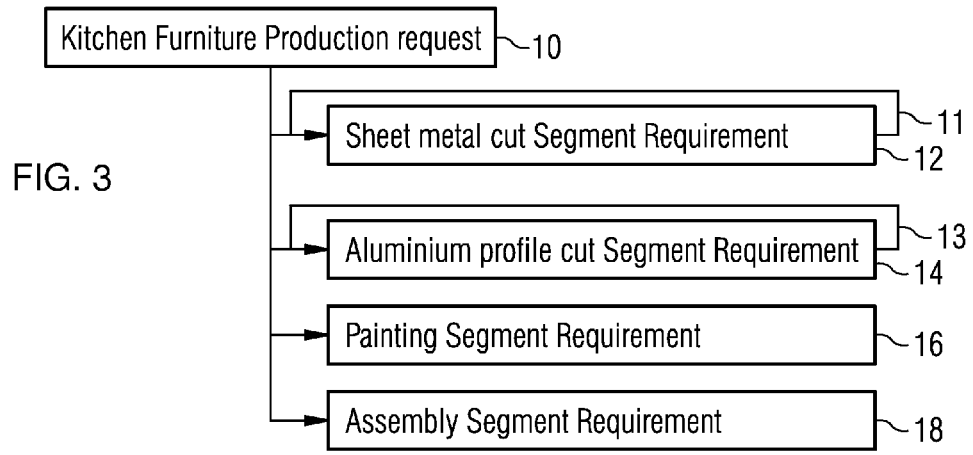
FIG. 3 is a schematic view of a production request for the kitchen furniture according to the invention.

FIG. 3 represents the same production request 10 for kitchen furniture but with repeatable segment requirements 12 and 14 replacing standard segment requirements. The metal cut segment requirement 12 and aluminium cut segment requirement 14 have each an arrow 11 or 13 going back to the beginning of the segment requirement creating a loop. This means that they can be execute an infinite numbers of times without altering the production request during their execution and without any control of the user. In other words, the control and the decision to re-execute a segment require will be done automatically by the MES according to the invention.

Figure 4:
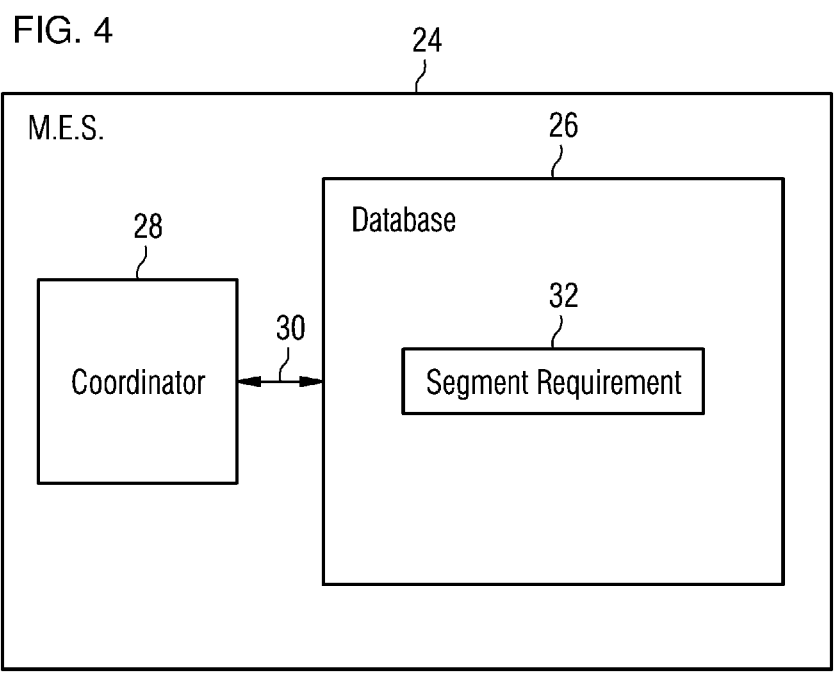
FIG. 4 is a partial schematic view of the new MES according to the invention.

As can be seen on FIG. 4, the MES 24 contains a MES coordinator 28 also called a production modeler, MES servers (not represented in FIG. 4) and a specific database 26. More particularly, the MES may contain a Production Order Manager (POM) and a Production Definition Manager (PDEFM) server and they perform with the coordinator the execution of the production request.

The MES coordinator 28 is operable to manage the production and control a plurality of Programmable Logic Controllers (PLC) which are the machines realizing the production process. The MES coordinator is an application communicating with MES servers through TCP/IP connection 30.

The MES servers store information of the production requests in execution or to be executed in the databases 26. They communicate with the MES Coordinator. The databases 26 store information about the segment requirements 32. For example a MES database may store: the materials to be used for a specific production request or for a specific segment requirement 32, the actuators to be used for a specific production request or for a specific segment requirement 32, the current status of the production request, the excepted values and current values of parameters given by sensors located on the production line.

According to the invention, the above mentioned MES database 26 further contains a dedicated area wherein each value taken by predetermined parameters are stored for each re-execution of a segment requirement. It is therefore possible to compare the result of the execution of a segment requirement with expected values and to automatically restart a segment requirement which has not been correctly executed.

The MES 24 also contains a Graphical User Interface (not shown in the drawings) wherein a user can define a segment requirement as being repeatable or not during the modeling phase. The fact that a segment requirement 32 is repeatable or not refers to the repeatability status of the segment requirement. This repeatability status is stored in the databases 26.

During execution of the segment requirements the MES coordinator 28 needs to know if a segment requirement 32 is "scheduled by the MES", has already been "executed" or if it is "in progress of execution". In other words, the MES coordinator 28 needs to know and to manage or modify the status of each segment requirement 32.

According to the invention the status of a repeatable segment requirement is changed by the coordinator 28 from "in progress of execution" to "executed" if and only if the result of the segment requirement has reached the expected value, for example when all the dimensions of a piece of metal resulting from a segment requirement execution correspond to an expected value. If it's not the case, at the end of the segment requirement execution, the status of the segment requirement is changed to "scheduled" and subsequently to "in progress" and the segment requirement is re-executed. This status management is realized automatically without any action from the user.

Status information for each segment requirement (simple or repeatable) and for the whole production request are also stored in the database 32 by the MES servers according to MES coordinator's instructions.

Before the re-execution of a requirement 32, previous values of the result of the execution of the same segment requirement are stored as historical values in a dedicated area of the database 26. Those previous values are subsequently deleted from the database dedicated area storing the current values of the result of the segment requirement execution. The database 26 also contains a dedicated area to store the current values of a parameter acquired during the re-execution of the segment requirement and representing the result of the execution of the segment requirement.

Status information is used to understand the current status of a segment requirement, and are used by the MES system to properly manage the segment requirement execution. The historical values can also be used by an operator to understand why the result of a segment requirement did not meet the expected values.

Furthermore, messages exchanged between MES Servers and the MES coordinator 28 or between the MES server and another external source manage the fact that a segment requirement may be repeatable. In other words, the information indicating that an execution of a segment requirement is repeatable is embedded in the messages itself for a specific segment requirement. By reading the message containing the segment requirement and containing its repeatable status, the MES coordinator 28 knows that it needs to check the intermediate product resulting from the execution of the segment requirement. The MES coordinator 28 may also read the expected values in the database. In other words, the MES coordinator 28 and MES servers exchange messages with information about segment requirements. The information are those needed by the MES system to execute a specific segment requirement or for generic operations (Add, Update, Get). In these messages in addition to this kind of information the "type" or repeatability status of the segment requirement is specified, i.e. repeatable or simple.

In addition the MES 24 according to the invention also accepts messages from external applications which specified the type of the segment requirement. For example, the MES system according to the invention accepts production requests sent by an external Enterprise Resource Planning (ERP). If the ERP is able to indicate that a segment requirement is repeatable, the MES 24 is able to import the segment requirements and to manage them.

Using a MES according to the invention, if the user understands that a segment requirement need to be repeated he can indicate while modeling the production process that a specific segment requirement needs to be repeated in case its execution does not provide a result good enough. The user only needs to indicate which specific segment requirement needs to be repeatable, which sensors needs to be checked and the expected result values of the intermediate product resulting of the execution of the segment requirement. At the time of the production if the result of this specific segment requirement is not good enough, the segment requirement will be automatically repeated until the result is as expected.

The invention claimed is:

1. A manufacturing executing system (MES), comprising:
computing means and software tools to control machines involved in a production process, the MES configured to realize production requirements containing at least one segment requirement;
means for a user to define whether the segment requirement is repeatable or not;
a database configured to store segment requirements, said database further having for each of the segment requirements:
   a dedicated area to store each segment requirement repeatability status;
   a dedicated area to store at least a current value of a parameter acquired during an execution of the segment requirement and representing a result of an execution of the segment requirement; and
   a dedicated area to store expected values of the parameter;
a coordinator operable to communicate with said database to access the segment requirement, and operable to determine whether or not the execution of the segment requirement has to be repeated, said coordinator being operable to restart automatically the execution of the segment requirement depending on the segment requirement repeatability status and on the result of the execution of the segment requirement.

2. The manufacturing executing system according to claim 1, wherein said coordinator restarts the execution of the segment requirement when at least the current value of the parameter acquired during the execution of the segment requirement does not equal the stored expected value.

3. A method of producing a product, which comprises the steps of:
providing a manufacturing executing system according to claim 1;
during a modeling phase, performing the steps of:
   defining a production requirement having a plurality of segment requirements;
   defining, for each segment requirement, whether the segment requirement is repeatable or not;
   storing expected values to be reached by the execution of the segment requirement if the segment requirement is repeatable;
   storing the segment requirement and the repeatability status in at least a database;
during a production phase for each of the segment requirement, performing the steps of:
   reading the repeatability status;
   executing the segment requirement;
   if the segment requirement is repeatable, at an end of the segment requirement execution, checking if the result of the segment requirement correspond to the expected values, and if not perform the executing the segment requirement step.

* * * * *